May 14, 1929. C. C. ABBOTT ET AL 1,713,249
ELECTRIC HEATER
Filed Nov. 27, 1925
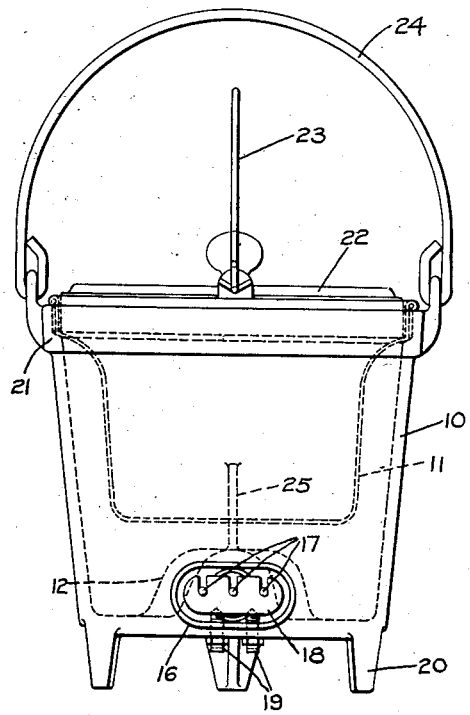
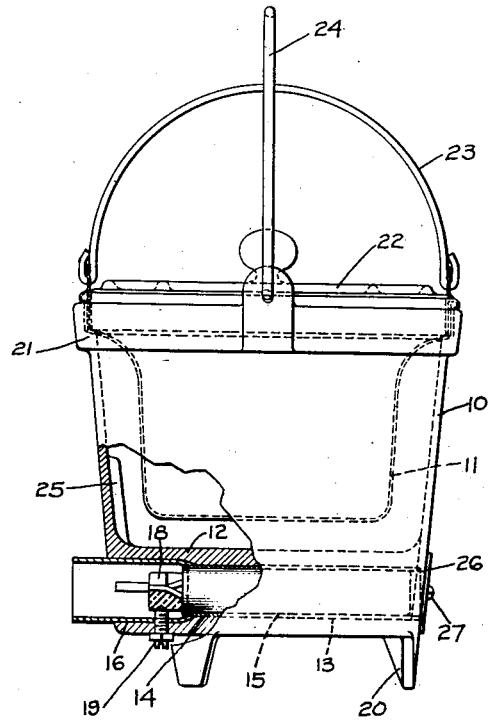
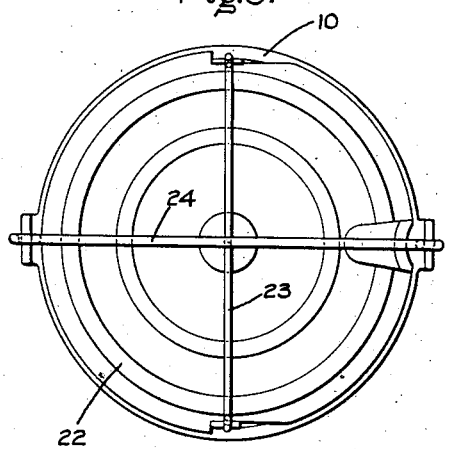
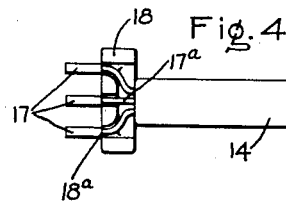
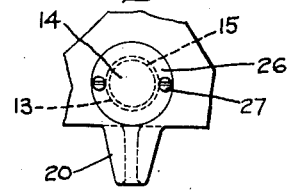
Inventors:
Charles C. Abbott,
Wilfred F. Gelinas,
by *Alexander F. Smith*
His Attorney.

Patented May 14, 1929.

1,713,249

UNITED STATES PATENT OFFICE.

CHARLES C. ABBOTT AND WILFRED F. GELINAS, OF PITTSFIELD, MASSACHUSETTS, ASSIGNORS TO GENERAL ELECTRIC COMPANY, A CORPORATION OF NEW YORK.

ELECTRIC HEATER.

Application filed November 27, 1925. Serial No. 71,536.

Our invention relates to electric heaters, more particularly to electrically heated pots, and has for its object the provision of a simple, reliable and efficient device of this character.

Our invention has especial application to electrically heated glue pots, although it may obviously be used in various other heaters.

In carrying out our invention in one form we utilize a cast metal receptacle or body which is provided with an integral boss at the bottom projecting upward into the receptacle. In this boss is cast a metallic tube which forms a smooth bore for an electric heating unit inserted therein whereby a good thermal relation is established between the metal of the pot and the heating unit so that heat is conducted freely from the unit to the pot.

For a more complete understanding of our invention, reference should be had to the accompanying drawing in which Fig. 1 is a front elevation view of a glue pot embodying our invention; Fig. 2 is a side elevation view partially in section; Fig. 3 is a plan view; Fig. 4 is a plan view of the electric heating element; while Fig. 5 is a fragmentary view showing details of construction.

Referring to the drawing, we have shown our invention in one form as applied to a glue pot of the double-boiler type, it being provided with a cast metal outer receptacle 10 in which water is heated and with an inner receptacle 11, which is set in the outer receptacle and extends downward into the heated water. The receptacle 10 is made of a suitable cast metal, such as iron or aluminum. Centrally located in the bottom of the receptacle 10, and cast integral therewith, is a cast metal boss 12, which extends across the bottom of the receptacle and projects upward into its interior. The boss 12 is provided with an aperture 13, extending through it and opening at each end to the outside of the receptacle. A suitable electric heating unit 14 is inserted in this aperture. With this arrangement it will be observed that the heating unit is brought upward into the interior of the receptacle so as to be largely surrounded by the liquid in the receptacle. Heat is therefore transferred very efficiently from the heating unit to the liquid.

The aperture 13 is formed during the casting of the receptacle and is defined in part by means of a metallic tube 15, made of a suitable metal such as steel, around which the metal of the receptacle is cast. This tube provides a bore having a smooth wall whereby a good thermal relation can be obtained between the wall of the bore and the heating unit 14 which is inserted in the bore. By using the tube as a core for that portion of the aperture 13, which is to be in good thermal relation with the heating unit, there remains no necessity for a subsequent boring or milling operation to smooth the wall of the aperture to receive the heating unit. A very inexpensive construction is thus provided.

The electric heating unit 14 is of any suitable type, such as a cartridge type shown, for example, in Abbott Patent No. 1,432,435, dated October 17, 1922. It is provided with an outer cylindrical metallic sheath which fits snugly within the bore formed by the tube 15 so as to be in good thermal relation therewith. The tube 15 does not extend entirely throughout the full length of the boss, an enlarged space defined by a flattened tube 16 being provided at one end for the terminals 17 of the heating unit. The boss 12 is correspondingly enlarged around the space 16. A welded joint is provided between the abutting ends of the tube 14 and the flattened tube 16. When the receptacle 10 is being cast these tubes, forming a core for the aperture 13, are filled with sand to prevent their collapsing when the molten metal is poured around them. This sand also closes the open space at the end of the flattened tube 16, which remains around the end of the tube 14.

Three terminals 17 are provided, the middle one of these terminals leading to a central point of the heating unit. The terminals are upheld and secured in spaced relation by means of a block 18 of suitable insulating material, such as porcelain, which is placed in the space 16 after the heating unit has been inserted, and secured by means of screws 19. As shown, the terminals 17 are in the form of contact pins, these pins being formed by brazing sleeves on the ends of stiff conducting leads $17^a$ leading into the interior of the heating unit where they are connected to the resistance conductor. The insulating block 18 is provided with slots $18^a$ in its upper edge in which the leads lie and whereby they are spaced apart. The two outer leads are bent away from the central lead at the point where they emerge from the heating unit in order to provide proper spacing for the contact pins 17. Preferably the leads are bent and the insulating block 18 put in place on the leads, as indicated in Fig. 4, and the heating unit then inserted after which the screws 19 are turned upward to seat in depressions provided for them in the lower edge of the block 18. The contact pins 17 are slightly larger in diameter than the width of the slots in the block 18 so that their inner ends rest against the outer face of the block, as shown in Fig. 4, the stiff leads only lying in the slots.

Connection between the heating unit and a suitable source of electric supply is made by means of an attachment plug arranged to cooperate with the contact pins, circuit control means being provided whereby the electrical connections can be varied to give several rates of heat generation in a well known manner. For example, the middle contact pin may be connected to one side of the supply source with the two outside contact pins connected to the other side to give a high rate of heat generation for example, when the pot is being initially heated. A medium heat can be obtained by connecting the middle and one outside contact pin to opposite sides of the supply source, while a low heat can be obtained by connecting the two outside pins to the supply source. The flattened tube 16 projects for a short distance so as to form a support for the plug.

Preferably the receptacle is somewhat smaller at the bottom and is provided with a flanged top whereby it may be seated in an aperture in a worktable or bench. Legs 20 cast integral with the receptacle are provided for use in case the receptacle is not mounted in this manner. The inner receptacle 11 is somewhat smaller than the outer and is provided with a flanged top which rests on a shoulder 21 provided for it in the top of the outer receptacle. A suitable cover 22 is provided as well as a bail 23. A bail 24 is likewise provided for the outer receptacle by means of which the pot will ordinarily be carried.

A rib 25 cast in the side wall of the outer receptacle extends from the bottom upward a suitable distance to indicate the proper water level before the inner receptacle is put in place.

In the operation of the pot the glue or other material to be heated will be placed in the inner pot 11, the temperature being regulated by making the proper connection with the terminals 17. A high rate of heating will be preferably used in starting, and a low rate thereafter being used to maintain the proper temperature.

The end of the bore 13 opposite the terminal end of the heating unit is closed by means of a plate 26 which is secured to the outer receptacle by means of simple screws 27. In case it is desired to remove the heating units for repairs or replacement it may be pushed out by removing the plate 25. This provision for forcibly ejecting the heating unit is a great advantage since the heating unit has a tendency to stick in the bore after continued use due to its expansion in heating. Before removing the unit the screws 19 will be retracted.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claim.

What we claim as new and desire to secure by Letters Patent of the United States is:

An electric heater comprising a cast metal receptacle provided with an internal boss extending across the bottom thereof, said boss being provided with an aperture extending therethrough opening on opposite sides of said receptacle, a metallic tube cast in said boss defining a part of said aperture, an electric heating unit fitting in said tube, contact pins for said heating unit, and a flattened tubular shaped member cast in said boss surrounding said contact pins.

In witness whereof, we have hereunto set our hands this 23rd day of November, 1925.

CHARLES C. ABBOTT.
WILFRED F. GELINAS.